United States Patent
Byeun et al.

(10) Patent No.: US 7,575,631 B2
(45) Date of Patent: Aug. 18, 2009

(54) FABRICATION METHOD OF GALLIUM MANGANESE NITRIDE SINGLE CRYSTAL NANOWIRE

(75) Inventors: Yun-Ki Byeun, Seoul (KR); Kyong Sop Han, Seoul (KR); Han Kyu Seong, Seoul (KR); Heon Jin Choi, Seoul (KR); Sung Churl Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 678 days.

(21) Appl. No.: 11/314,502

(22) Filed: Dec. 22, 2005

(65) Prior Publication Data
US 2006/0292055 A1 Dec. 28, 2006

(30) Foreign Application Priority Data
Jun. 24, 2005 (KR) .................. 10-2005-0055256

(51) Int. Cl.
*C01B 21/00* (2006.01)
(52) U.S. Cl. ........................ 117/952; 423/409
(58) Field of Classification Search ............... 977/963; 423/409; 117/952
See application file for complete search history.

(56) References Cited

U.S. PATENT DOCUMENTS

| | | | | |
|---|---|---|---|---|
| 4,144,116 | A * | 3/1979 | Jacob et al. ............ | 117/91 |
| 5,021,134 | A * | 6/1991 | Blackburn et al. ....... | 204/177 |
| 6,656,615 | B2 * | 12/2003 | Dwilinski et al. ........ | 428/698 |
| 2003/0136986 | A1 | 7/2003 | ElMasry et al. | |
| 2005/0009310 | A1 | 1/2005 | Vaudo et al. | |
| 2005/0048686 | A1 | 3/2005 | Kitaoka et al. | |

FOREIGN PATENT DOCUMENTS

WO WO 03/078701 9/2003

OTHER PUBLICATIONS

Tomasz Szyszko et al, "Preparation of Ga 1–x Mnx N bulk single crystals with c-axis parallel to dominant plane of platelets" Journal of Crystal Growth 276 (2005) 419-423.*
Doo Suk Han et al, "Ferromagnetic Mn-doped GaN nanowires", Applied Physics Letters 86, 032506 (2005).*
Kim et al., "Growth of GaN Nanorods by a Hydride Vapor Phase Epitaxy Method", Advanced Materials, 14, No. 13-14, pp. 991-993, (2002).

(Continued)

*Primary Examiner*—Wayne Langel
(74) *Attorney, Agent, or Firm*—Finnegan, Henderson, Farabow, Garrett & Dunner, L.L.P.

(57) ABSTRACT

The present invention relates to a fabrication method of gallium manganese nitride (GaMnN) single crystal nanowire, more particularly to a fabrication method of GaMnN single crystal nanowire substrate by halide vapor phase epitaxy (HVPE) in which such metal components as gallium (Ga) and manganese (Mn) react with such gas components as nitrogen ($N_2$), hydrogen chloride (HCl) and ammonia ($NH_3$), wherein the amount of the gas components are adjusted to control the Mn doping concentration in order to obtain nanowire having a perfect, one-dimensional, single crystal structure without internal defect, concentration of holes, or carriers, and magnetization value of which being determined by the doping concentration and showing ferromagnetism at room temperature, thus being a useful spin transporter in the field of the next-generation spintronics, such as spin-polarized LED, spin-polarized FET, etc.

5 Claims, 3 Drawing Sheets

OTHER PUBLICATIONS

Molnar et al., "Growth of Gallium Nitride by Hydride Vapor-Phase Epitaxy", Journal of Crystal Growth, 178, pp. 147-156, (1997).

He et al., "Growth of GaN Nanowires by Direct Reaction of Ga with $NH_3$", Journal of Crystal Growth, 231, pp. 357-365, (2001).

Sonoda et al., "Molecular Beam Epitaxy of Wurtzite (Ga,Mn)N Films on Sapphire(0 0 0 1) Showing the Ferromagnetic Behaviour at Room Temperature", 237-239, pp. 1358-1362, (2002).

Pearton et al., "Advances in Wide Bandgap Materials for Semiconductor Spintronics", Materials Science and Engineering, R 40, pp. 137-168, (2003).

Johnson et al., "Single Gallium Nitride Nanowire Lasers", Nature Materials, vol. 1, pp. 106-110, (2002).

Sanyal et al., "Electronic Structure and Magnetism of Mn-Doped GaN", Physical Review B, vol. 68, pp. 205210-205211 to 205210-205217, (2003).

* cited by examiner (A)

(A1)

(B)

(C)

(C1)

FABRICATION METHOD OF GALLIUM MANGANESE NITRIDE SINGLE CRYSTAL NANOWIRE

CROSS REFERENCE TO RELATED APPLICATION

This application is based on, and claims priority from Korean Patent Application No. 10-2005-0055256, filed on Jun. 24, 2005, the disclosure of which is hereby incorporated by reference.

TECHNICAL FIELD

The present invention relates to a fabrication method of gallium manganese nitride (GaMnN) single crystal nanowire, more particularly to a fabrication method of GaMnN single crystal nanowire substrate by halide vapor phase epitaxy (HVPE) in which metal components such as gallium (Ga) and manganese (Mn) react with gas components such as nitrogen ($N_2$), hydrogen chloride (HCl) and ammonia ($NH_3$), wherein the amount of the gas components are adjusted to control the Mn doping concentration in order to obtain nanowire having a perfect, one-dimensional, single crystal structure without internal defect, concentration of holes, or carriers, and magnetization value of which being determined by the doping concentration and showing ferromagnetism at room temperature, thus being a useful spin transporter in the field of the next-generation spintronics, such as spin-polarized LED, spin-polarized FET, etc.

BACKGROUND ART

The remarkable development in today's IT technology is based on silicon semiconductors. Semiconductors are not only important in science and researches, but also in industry and economy. However, as development of silicon semiconductors draws near to its limitation in principle, the world has now begun to turn to new-generation semiconductors aiming at diversification of technologies. In this respect, compound semiconductors capable of controlling both light and electrons have been attaining high spotlight.

Gallium nitride (GaN) is the most typical compound semiconductor with a direct band structure and a wide band gap energy (3.45 eV). It is very useful because it is operable in blue and UV regions of light spectrum. However, conventional gallium nitride semiconductors, having diameters of micrometer size and two-dimensional structures, are limited in their uses in electric and electronic nano devices which are becoming smaller and smaller. The use of blue laser in DVD enables much improved integration of data than red laser, but to do so, realization of a nano (a billionth) sized semiconductor is essential. Thus, it is required to fabricate gallium nitride into nanotube or nanowire. Besides, nano-size semiconductors can be widely used in various fields, from nano/molecular electronic engineering to optical/probe scanning spectroscopy, due to their physical, optical and electronic properties.

Nanowire refers to a one-dimensional, linear material of hundreds of nanometers, micrometers or millimeters long, whose length is much larger than its diameter. Physical properties of nanowire depend on its diameter and length. Whereas researches on physical properties of nano particles and manufacture methods thereof are being carried actively, there are few manufacture methods of nanowire available. Examples of conventional methods include template method, chemical vapor deposition and laser ablation.

In the template method, pores of nanometer to hundreds of nanometer units are used as template of nanowire. For example, an aluminum electrode is oxidized to transform the surface into aluminum oxide, which is etched electrochemically to obtain nanopores. The resultant template is immersed in a solution containing metal ions and electricity is applied. Then, the metal ions accumulate on the aluminum electrode, filling the pores. Finally, the oxide is removed to obtain metallic nanowire. However, this method is too complicated and requires a lot of time. Moreover, the obtained nanowire is polycrystalline with poor quality and the process is not suitable for mass production.

Besides, since the diameter and length of the nanowire are determined by the size and depth of the pores, it is very difficult to fabricate long nanowire having a diameter of several nanometers with the present technology.

To solve these problems, chemical vapor deposition and laser ablation have been commonly used. Through these alternatives, nanowire of semiconductors, such as GaN, GaAs, GaP, InAs and InP, has become available.

In chemical vapor deposition (CVD), a source gas containing a component material is injected into a reactor and decomposed by heat or plasma, thereby forming nano-sized tube or wire on the substrate. Chemical vapor deposition is classified into low-pressure CVD (LPCVD), ambient-pressure CVD (APCVD) and high-pressure CVD (HPCVD), depending on the pressure inside the reactor. Plasma enhanced CVP (PECVD) enables fabrication of nanotube at relatively low temperature using plasma. This method requires a process of forming a transition metal film prior to the growth of carbon nanotube. The transition metal catalyzes decomposition of the source gas and acts as nucleus from which nanotube or nanowire grows. In actual manufacture of nano material, the nano material grows on a wafer In the field of data storage, direct transition type, broadband group III-V semiconductors are drawing attention with regard to metal-based giant magnetoresistance (GMR) and tunneling magnetoresistance (TMR). When a transition metal like manganese (Mn) is doped into these group III-V semiconductors, not only spin transfer but also spin control is achievable. Consequently, semiconductors for operation circuits become available. They are drawing attention as new-generation spintronics materials capable of offering light emitting diode (LED) properties through P-N junction.

Until now, researches mainly focused on three-dimensional films. Since the three-dimensional films are grown by low-temperature molecular beam epitaxy (MBE), the doped GaMnN film could not fully operate its performance because of internal defect and formation of secary phase. Thus, a perfect single crystal without internal defect even when doped with manganese (Mn) was required and development of one-dimensional nanowire capable of realizing quantum effect was needed. And, even if one-dimensional nanowire doped with manganese (Mn) was to be grown, control of the doping concentration of the transition metal was impossible. The doping concentration of manganese (Mn) is an important factor because it greatly affects the magnetization value and the concentration of holes, or carriers.

DISCLOSURE OF THE INVENTION

The present inventors have made various efforts to find a method for controlling the doping concentration of manganese (Mn) in GaN single crystal nanowire doped with manganese. In doing so, they have discovered that the doping concentration of manganese can be controlled by adjusting the proportion of hydrogen chloride (HCl) gas and ammonia ($NH_3$) gas to a specific range in the halide vapor phase epitaxy (HVPE), where metallic gallium (Ga) and metallic Mn react with HCl gas on a substrate in the presence of nitrogen ($N_2$) gas in a specific temperature range to form gallium chloride ($GaCl_x$) gas and manganese chloride ($MnCl_x$) gas, which in turn react with $NH_3$ gas.

Therefore, in an aspect of the present invention, there is provided a fabrication method of GaMnN single crystal nanowire capable of controlling the doping concentration of metallic manganese through halide vapor phase epitaxy (HVPE) with controlled use of HCl gas and NH$_3$ gas.

BRIEF DESCRIPTION OF THE DRAWINGS

The above and other objects, features and other advantages of the present invention will be more clearly understood from the following detailed description taken in conjunction with the accompanying drawing, in which.

BEST MODE FOR CARRYING OUT THE INVENTION

The present invention is characterized by a fabrication method of GaMnN single crystal nanowire in which metallic gallium (Ga) and metallic manganese (Mn) are reacted with hydrogen chloride (HCl) gas and ammonia (NH$_3$) gas at a temperature of from 600 to 700° C. under nitrogen atmosphere.

Hereinafter, the present invention is described in more detail.

The present invention relates to a fabrication method GaMnN single crystal nanowire by halide vapor phase epitaxy (HVPE) using hydrogen chloride (HCl) gas and ammonia (NH$_3$) gas.

GaMnN single crystal nanowire, which has been drawing much of public attention as the next-generation spintronics material, can be obtained by doping metallic manganese into gallium nitride. Perfect, single crystal, one-dimensional nanowire with no internal defect is required. While the doping concentration of manganese is considered as important factor, since it affects the hole, or carrier, concentration and magnetization value, the method to control it has not been developed as yet. Therefore, on gallium nitride (GaN) is used as single crystal nanowire.

In general, a material having a hole concentration of $10^{18}$ cm$^{-3}$ at room temperature, and in particular, showing ferromagnetic property at room temperature becomes a good spintronics material. The nanowire in accordance with the present invention with an Mn doping concentration of about 8% has a hole concentration at of $2\times10^{19}$ cm$^{-3}$ and a magnetization value of $6\times10^{-2}$ emu/g at room temperature. So, it becomes a good ferromagnetic semiconductor.

The halide vapor phase epitaxy (HVPE) of the present invention is a kind of gas phase epitaxy in which crystal is formed on a substrate by thermal decomposition and reaction as reactant gas is flowed on the substrate, which proceeds according to the following scheme 1:

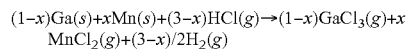

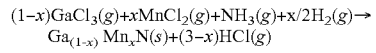

Scheme 1

Metallic gallium (Ga) and metallic manganese (Mn) react with hydrogen chloride (HCl) gas to form chlorides, which in turn react with ammonia (NH$_3$) gas to give GaMnN single crystal nanowire. If the hydrogen chloride (HCl) gas is injected continuously, more chlorides are formed, thereby reducing the doping concentration of manganese relatively. Thus, in the present invention, injection of the hydrogen chloride (HCl) gas is adjusted to control the doping concentration of manganese.

Figure 1:
FIG. 1 schematically illustrates the growth of the Mn-doped GaMnN nanowire in accordance with the present invention.

That is, referring to FIG. 1, metallic gallium (Ga) and metallic manganese (Mn) are reacted with hydrogen chloride (HCl) gas and ammonia (NH$_3$) gas at a temperature of from 600 to 700° C. and under nitrogen (N$_2$) atmosphere to obtain GaMnN single crystal nanowire 11 on a substrate 10. The present invention is characterized in that the proportion of the hydrogen chloride (HCl) gas, which is used to form the chlorides of metallic gallium (Ga) and metallic manganese (Mn), and the ammonia (NH$_3$), which is used to form the GaMnN single crystal nanowire, is adjusted to control the doping concentration of manganese (Mn), in order to attain adequate hole concentration and magnetization value to be used as spintronics material. To conclude, the present invention is characterized by the reaction condition for attaining adequate doping concentration of manganese (Mn) by adjusting the proportion of the reaction gases used in halide vapor phase epitaxy (HVPE).

Figure 2:
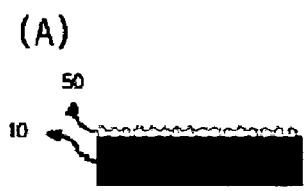
FIG. 2 illustrates the modified halide vapor phase epitaxy (HVPE) process of the present invention, where (A), (B) and (C) are front views and (A1) and (C1) are top views.
Figure 2:
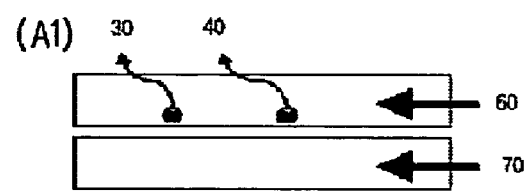
Figure 2:
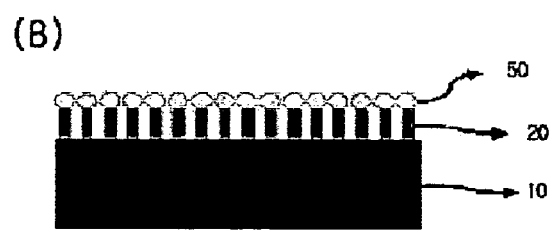
Figure 2:
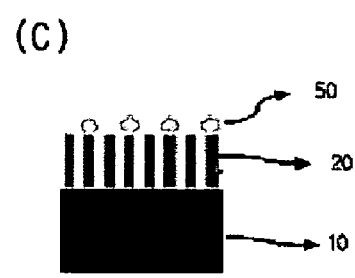
Figure 2:
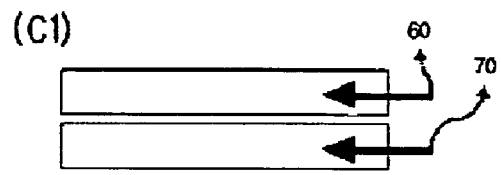

Now referring to FIG. 2, the fabrication method of GaMnN single crystal nanowire in accordance with the present invention is described in further detail.

As seen in FIG. 2(A), metallic gallium (Ga) 30 and metallic manganese (Mn) 40 are reacted with hydrogen chloride (HCl) gas 60 on a substrate 10 to form gallium chloride (GaCl$_x$) gas and manganese chloride (MnCl$_x$) gas.

The reaction is performed in the presence of nitrogen (N$_2$) gas, which is used as at once carrier gas and dilute gas.

The doping concentration of manganese is determined by the injection amount of the hydrogen chloride (HCl) gas. Since the doping concentration of manganese affects hole, or carrier, concentration, magnetization value, etc. of the obtained GaMnN single crystal nanowire, the injection amount of hydrogen chloride (HCl) gas is an important factor.

Preferably, the volume ratio of the hydrogen chloride (HCl) to the nitrogen (N$_2$) is in the range of from 0.005 to 0.025. If the volume ratio is smaller than 0.005, single crystal nanowire is not formed but polycrystalline nanowire grows. Otherwise, if it exceeds 0.025, doping concentration of Mn becomes smaller than about 2%, and thus ferromagnetism is not attained at room temperature.

Preferably, the substrate is maintained at 600 to 700° C. If the temperature is below 600° C., Mn may not be doped into the nanowire. Otherwise, if the temperature exceeds 700° C., the nanowire becomes too thick, thereby forming a "nanorod." In general, fabrication of gallium nitride (GaN) nanowire is performed in a broad temperature range of 500 to 1000° C., but in the present invention, it is preferable to limit the temperature range to 600 to 700° C.

It is preferable to maintain growth time for 30 to 60 min at the above temperature range. The growth time varies depending on the temperature and thus it is desirable to use a suitable amount of growth time according to the nanowire to be fabricated.

The kind of a substrate is not particularly limited, but it is preferable to use one made of sapphire or silicon, more preferably, a substrate made of sapphire. In addition, a catalyst or template layer may be present on the substrate.

Also, in the present invention, nickel (Ni) may be deposited on a sapphire substrate using a sputtering device to form a catalytic layer as shown in FIG. 2(B). The catalyst is removed after the nanowire is grown, as in FIG. 2(C). In the process, Ni is deposited as quantum dots. The catalytic layer is not particularly limited but any one in the related art may be used. In the present invention, Ni is used because it melts at low temperature and is fairly soluble in metallic Ga.

Each of the produced gallium chloride ($GaCl_x$) gas and manganese chloride ($MnCl_x$) gas reacted with ammonia ($NH_3$) gas to form GaMnN single crystal nanowire. That is, ammonia ($NH_3$) gas is injected along with the hydrogen chloride (HCl) gas and the two reactions are performed at the same time. The obtained nanowire has a thickness in the range of from 80 to 150 nm and shows ferromagnetism of from about $1\times10^{-3}$ to about $6\times10^{-2}$ emu/g. While the GaN nanowire is non-ferromagnetic, the GaMnN nanowire is ferromagnetic due to the doping of manganese.

Volume ratio of the ammonia ($NH_3$) gas to the nitrogen ($N_2$) gas is controlled to 0.067 to 0.167. If the volume ratio is smaller than 0.067, Mn is not doped but the manganese chloride ($MnCl_x$) is present on the surface of the GaN nanowire. Otherwise, if it exceeds 0.167, a three-dimensional film may be formed.

As described above, since the GaMnN single crystal nanowire fabricated in accordance with the present invention has well-controlled manganese (Mn) concentration, it has controlled magnetization value and hole, or carrier, concentration, and thus is suitable for spintronics material.

Hereinafter, the present invention is described in further detail with reference to the following example. However, the following example is only for the understanding of the present invention and it should not be construed as limiting the scope of the present invention.

EXAMPLE

A (0001) sapphire substrate was washed with BOE (buffered oxide echant) to remove any native oxides, and then nickel (Ni) was deposited for 20 sec using a sputtering device. The nickel (Ni) was deposited as 2 nm-sized quantum dots. The sapphire substrate coated with nickel (Ni) was put in a horizontal tube furnace of 650° C. for 30 min to grow GaMnN single crystal nanowire. The tube was ¼ inch wide. Metallic Ga and metallic Mn were positioned with a spacing of 0.5 inch and 500 sccm of $N_2$, 1 sccm of HCl gas and 20 sccm of ammonia ($NH_3$) gas were injected. Of the 500 sccm of $N_2$ gas, 200 sccm was used as diluent gas and 300 sccm was used as carrier gas.

Figure 3:
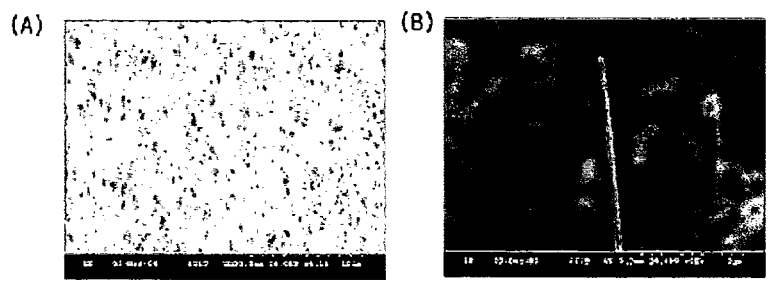
FIG. 3 shows scanning electron micrographs of the nanowire in accordance with the present invention (magnification: (A)=×4.5 k; (B)=×20 k)

Scanning electron micrographs were taken in order to confirm formation of the GaMnN single crystal nanowire. FIG. 3(A) is one at a magnitude of ×4.5 k (×4,500) and FIG. 3(B) is one of a single nanowire with the catalytic layer removed taken at a magnitude of ×20 k (×20,000).

Figure 4:
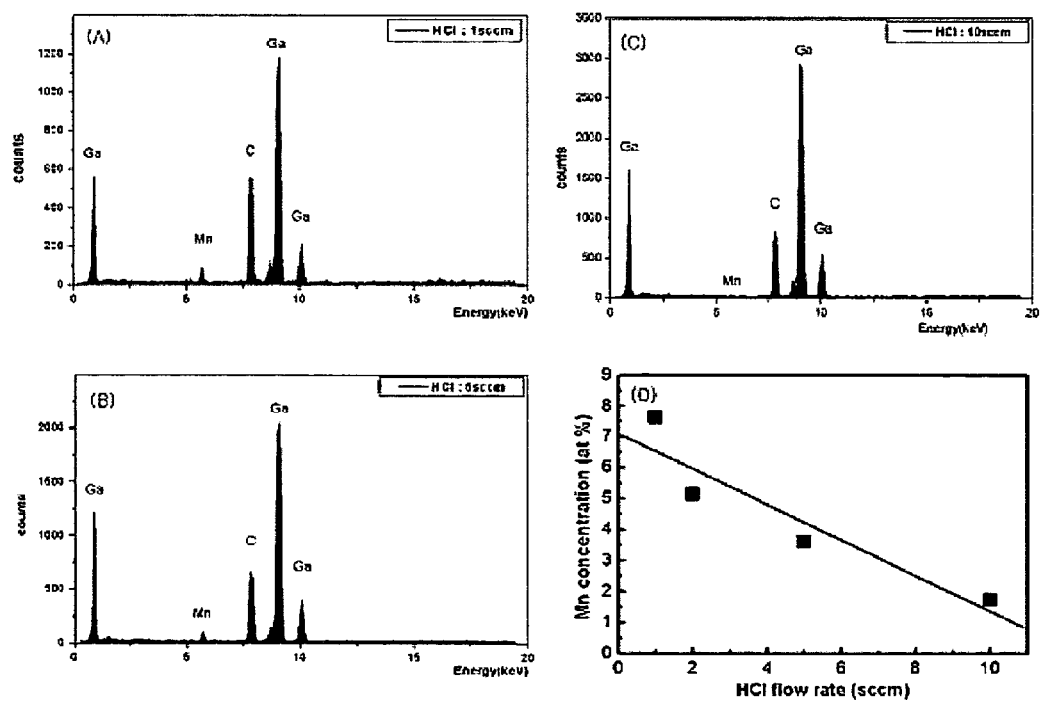
FIG. 4 shows the change in the doping concentration of manganese depending on the amount of HCl gas, measured with an energy dispersive X-ray spectrometer (EDX)

FIG. 4 shows the change in the doping concentration of manganese depending on the amount of HCl gas, measured with an energy dispersive X-ray spectrometer (EDX). When the initial volume of the HCl gas was 1 sccm, the doping concentration of Mn was 7.9%. When the initial volume of the HCl gas was 10 sccm, the doping concentration of Mn was 1.5%. That is, it was confirmed that the doping concentration of Mn decreases as the initial volume of the HCl gas increases.

Figure 5:
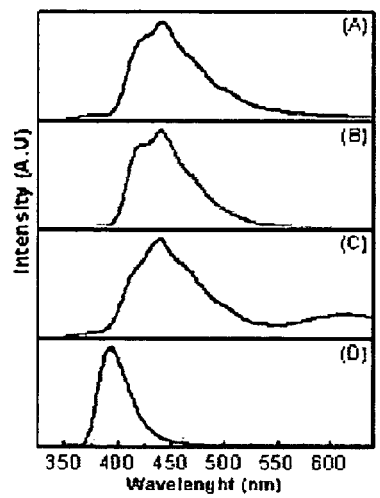
FIG. 5 shows polarization (PL) spectrum of the GaMnN single crystal nanowire in accordance with the present invention, as compared with GaN nanowire, at room temperature.

FIG. 5 shows polarization (PL) spectrum of the GaMnN single crystal nanowire in accordance with the present invention, as compared with GaN nanowire, at room temperature. The GaMnN nanowire showed PL property at 2.8 eV, a longer-wave region than that of the GaN nanowire which had a band gap of 3.4 eV. This confirms that the band structure changed by the doping of Mn.

Figure 6:
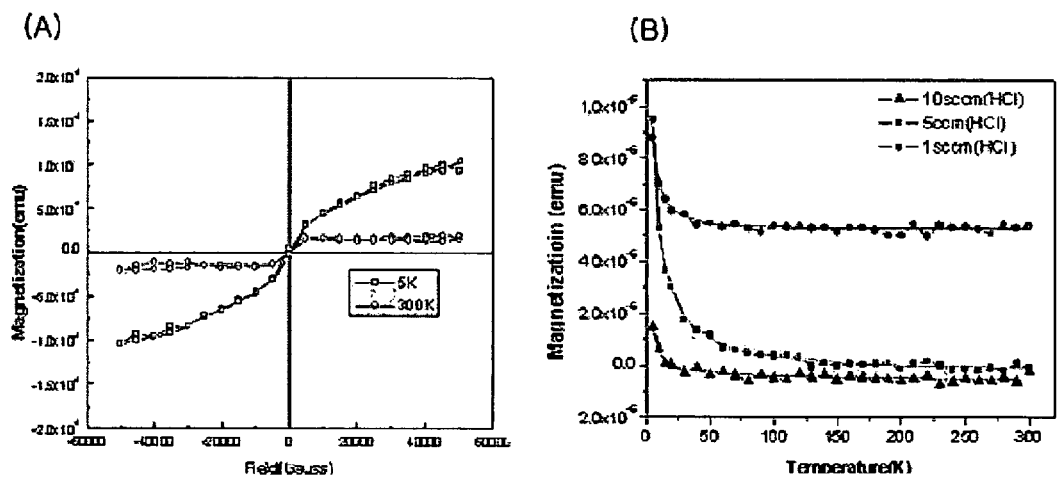
FIG. 6 shows magnetization value of a superconducting quantum interference device (SQUID) manufactured from the GaMnN single crystal nanowire in accordance with the present invention, where (A) shows M-H* curves for GaMnN nanowire having a doping concentration of 8%; and (B) shows M-T** curves depending on the doping concentration. M-H* curves show the relationship of magnetization and magnetic field; and M-T** curves show the relationship of magnetization and temperature.

FIG. 6 shows magnetization value of a superconducting quantum interference device (SQUID). Ferromagnetism was confirmed as Mn was doped into GaN, which is a non-ferromagnetic material. However, as seen in the figure, it is inferred that ferromagnetism is attained when the doping concentration of Mn is at least 4%. To obtain a doping concentration of Mn of at least 4%, the GaMnN nanowire should be grown with 1 to 5 sccm of HCl gas. To conclude, the GaMnN nanowire according to the present invention can be a useful, next-generation spintronics material.

INDUSTRIAL APPLICABILITY

As apparent from the above description, the present invention, which fabricates GaMnN single crystal nanowire by halide vapor phase epitaxy (HVPE) with controlled volume of hydrogen chloride (HCl) gas and ammonia ($NH_3$) gas, is expected to be useful as next-generation semiconductors such as light emitting diodes, particularly in spintronics, such as giant magnetoresistance (GMR) and tunneling magnetoresistance (TMR).

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A fabrication method of gallium manganese nitride single crystal nanowire by reacting metallic gallium and metallic manganese with hydrogen chloride gas and ammonia gas at a temperature ranging from 600 to 700° C. under an atmosphere of nitrogen gas.

2. The fabrication method of claim 1, wherein the volume ratio of said hydrogen chloride gas to nitrogen gas is in the range of from 0.005 to 0.025.

3. The fabrication method of claim 1, wherein the volume ratio of said ammonia gas to nitrogen gas is in the range of from 0.067 to 0.167.

4. The fabrication method of claim 1, wherein nickel is used as catalyst in said reaction.

5. The fabrication method of claim 1, wherein said nanowire has a thickness in the range of from 80 to 150 nm and shows ferromagnetism at room temperature.

* * * * *